(12) United States Patent
Koikkalainen

(10) Patent No.: US 8,838,847 B2
(45) Date of Patent: Sep. 16, 2014

(54) APPLICATION ENGINE MODULE, MODEM MODULE, WIRELESS DEVICE AND METHOD

(75) Inventor: Mika Antero Koikkalainen, Tampere (FI)

(73) Assignee: Broadcom Corporation, Irvine, CA (US)

( * ) Notice: Subject to any disclaimer, the term of this patent is extended or adjusted under 35 U.S.C. 154(b) by 259 days.

(21) Appl. No.: 13/351,389

(22) Filed: Jan. 17, 2012

(65) Prior Publication Data

US 2013/0179527 A1    Jul. 11, 2013

(30) Foreign Application Priority Data

Jan. 11, 2012  (GB) .................................. 1200400.8

(51) Int. Cl.
*G06F 13/28* (2006.01)
*G06F 13/38* (2006.01)
*G06F 15/167* (2006.01)
*G06F 15/173* (2006.01)

(52) U.S. Cl.
USPC ................ 710/22; 710/23; 710/62; 709/212; 709/220; 709/225; 709/226

(58) Field of Classification Search
None
See application file for complete search history.

(56) References Cited

U.S. PATENT DOCUMENTS

| | | | |
|---|---|---|---|
| 7,580,674 B2* | 8/2009 | Gorsuch et al. .................. 455/25 |
| 2005/0025161 A1* | 2/2005 | Spooner ......................... 370/401 |
| 2005/0177702 A1* | 8/2005 | Chichkov et al. ............... 712/36 |
| 2007/0160124 A1* | 7/2007 | Dorr ............................. 375/222 |
| 2008/0056253 A1* | 3/2008 | Minami et al. ................. 370/389 |
| 2010/0095089 A1 | 4/2010 | Kwon ............................. 712/30 |
| 2010/0153618 A1* | 6/2010 | Mathieson et al. ........... 711/102 |

FOREIGN PATENT DOCUMENTS

EP    0 855 643 A1    7/1998

\* cited by examiner

*Primary Examiner* — Michael Sun
(74) *Attorney, Agent, or Firm* — Stanton IP Law

(57) ABSTRACT

A wireless device has a modem module and an application engine module. A communication and memory sharing interface connects the modem module to the application engine module. The application engine module has an application layer component for providing application layer processing for the wireless device and a modem component for providing, in combination with the modem module, modem processing for the wireless device. The wireless device has a memory and a memory interface for connecting the application engine module directly to the memory.

20 Claims, 2 Drawing Sheets

APPLICATION ENGINE MODULE, MODEM MODULE, WIRELESS DEVICE AND METHOD

TECHNICAL FIELD

The present invention relates to an application engine module, an application engine module and a modem module, a wireless device and a method of operating a wireless device.

BACKGROUND

It is in general desirable to reduce the cost of a processing system, such as a chipset, particularly those for use in consumer devices, including for example mobile phones and other wireless devices. One way to achieve this is to share memory resources between several processor chips or chipsets by using a communication and memory sharing interface.

As a particular example, historically a modem module and an application engine module of a wireless device, such as a mobile phone or the like, have each been provided with their own dedicated external memory devices. However, as illustrated schematically in FIG. 1, it has been proposed to connect a modem module 100 of a wireless device, such as a mobile phone or the like, to an application engine (APE) module 110 of the wireless device via a communication and memory sharing interface (CMSI) 120, with the APE module 110 also being connected directly to a memory 130 of the wireless device via a memory interface 140. The modem module 100 has (indirect) access to the memory 130 via the CMSI 120 and the APE module 110. This means that dedicated memory resources (such as a dedicated synchronous dynamic random access memory (SDRAM) chip) need not be included specifically for the modem module 100 as such, or at least the amount of dedicated memory conventionally provided for the modem module 100 can be reduced, making the total components required for the modem module 100 in general both cheaper and physically smaller. CMSIs 120 may include, for example, chip-to-chip (C2C) interfaces or low latency interfaces (LLI), which both have low enough latencies to enable the modem module 100 to read from and write to the memory 130 rapidly via the interface 120. The modem module 100 may for example comprise one or more central processing units (CPU) 150 and optionally other modem hardware 160 which carry out baseband and radio frequency processing and handles signalling and also low level messaging to and from the network for the wireless device. The APE module 110 may for example comprise one or more APE CPUs 170 and optionally other APE hardware 180 which carry out application processing for the wireless device. One or both of the modem module 100 and the APE module 110 and/or one or more of the components thereof may be provided as a chipset, an application-specific integrated circuit (ASIC), field-programmable gate array (FPGA), etc. It may be noted that the memory sharing interface and control/communication interface parts of the CMSI 120 may be provided as separate physical interfaces.

A modem module 100 sharing memory 130 with an APE module 110 will, however, typically place high bandwidth requirements and tight latency requirements on the CMSI 120, because some of the modem module 100 hardware components require inputs to and outputs from the memory 130 that are of very high bandwidth and/or that occur with high frequency. As a result of this, the CMSI 120 in this arrangement in general has a high power consumption. Furthermore, in order to support inputs and outputs that are of high frequency/bandwidth, CMSIs 120 generally need relatively large physical layer connections to the modem module 100 and the APE module 110, which requires a large number of input/output connection pins at both the modem module 100 and the APE module 110. This can increase the required size of these modules. In any event, where C2C or LLI or the like is used, there is a limit to the number of input and output pins available for the connection between the CMSI 120 and the modem module 100 and the APE module 110 according to C2C and LLI specifications.

Developing network technologies mean modem data rates are set to increase. Thus, if memory sharing is used between modem modules 100 and APE modules 110 as described above, then the bandwidth requirements placed on the CMSI 120 will be increased further, and, as a result, power consumption and the minimum chipset area will also increase.

SUMMARY

In a first exemplary embodiment of the invention, there is an application engine module for a wireless device, the application engine module comprising: an application layer component for providing at least some application layer processing for a wireless device; a modem component for providing at least some modem processing for the wireless device; a memory interface for connecting the application layer component and the modem component directly to a memory of the wireless device; and a communication and memory sharing interface for connecting the modem component to a modem module of the wireless device.

In a second exemplary embodiment of the invention, there is in combination, a modem module and an application engine module for a wireless device, the modem module being connected to the application engine module by a communication and memory sharing interface, the application engine module comprising: an application layer component for providing at least some application layer processing for a wireless device; a modem component for providing, in combination with the modem module, modem processing for the wireless device; a memory interface for connecting the application layer component and the modem component directly to a memory of the wireless device.

There may also be provided in combination, a modem module and an application engine module as described above, the modem module being connected to the modem component of the application engine module by the communication and memory sharing interface, the modem component being constructed and arranged to provide, in combination with the modem module, modem processing for said wireless device.

In a third exemplary embodiment of the invention, there is a wireless device comprising: a modem module; an application engine module; a communication and memory sharing interface connecting the modem module to the application engine module; the application engine module comprising an application layer component for providing application layer processing for the wireless device; the application engine module comprising a modem component for providing, in combination with the modem module, modem processing for the wireless device; a memory; and a memory interface for connecting the application engine module directly to the memory.

In a fourth exemplary embodiment of the invention, there is a method of operating a wireless device, the wireless device comprising: a modem module; an application engine module comprising an application layer component for providing application layer processing for the wireless device and comprising a modem component for providing, in combination with the modem module, modem processing for the wireless device; a communication and memory sharing interface connecting the modem module to the application engine module; a memory; and a memory interface for connecting the application engine module directly to the memory; the method comprising: the modem module accessing the modem component of the application engine module via the communication and memory sharing interface to instruct the modem component to carry out processing for the modem module; the modem component accessing the memory via the memory interface to use the memory for said processing.

Further features and advantages of the invention will become apparent from the following description of preferred embodiments of the invention, given by way of example only, which is made with reference to the accompanying drawings.

DETAILED DESCRIPTION

Figure 1:
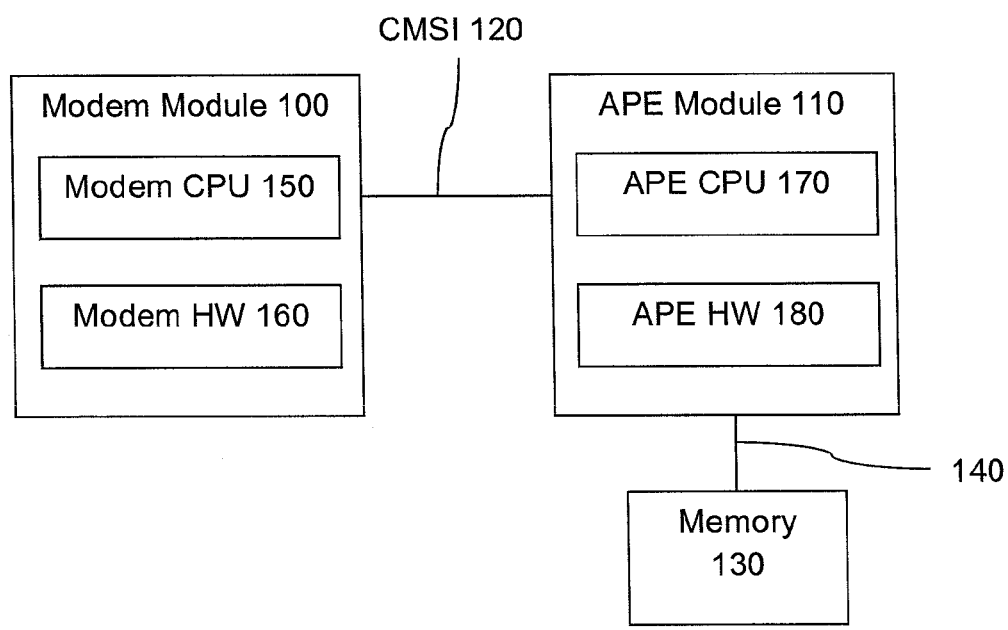
FIG. 1 shows schematically a prior art arrangement of a modem module, an application engine module, and a memory of a wireless device.

By providing a modem component for at least some modem processing in the application engine module, that modem component can access memory directly. This allows the bandwidth requirements of the communication and memory sharing interface to be kept down, which potentially simplifies manufacture and reduces manufacturing costs and keeps down the size of devices, as well as reducing power consumption by a wireless device in which the application engine module is installed. In practice, in embodiments, the modem module will also use the communication and memory sharing interface to access the memory of the wireless device directly.

In an embodiment, the modem component comprises a modem accelerator. Accelerators may be used to assist the operation of various aspects of a modem, including for example particularly a modem CPU. The modem accelerator may be for example a programmable accelerator which in use reads data from the memory of the device and decodes that data. Then, based on the decoding and the purpose of the accelerator, the modem accelerator could pass the results to a CPU of the modem, or make some modification to the data and write it back to the memory, etc. In specific embodiments, this modem accelerator may be for example a ciphering accelerator, a direct memory access module, etc., implemented in for example software or firmware, and possibly implemented in a CPU in the application engine module, which may be the main CPU of the application engine module or a separate CPU. (Ciphering accelerators and direct memory access are discussed further below).

In an embodiment, the modem component comprises a hardware ciphering accelerator. Hardware ciphering accelerators are used to carry out encryption of user data for transmission by wireless devices and decryption of user data that has been received by the wireless devices. Enabling the ciphering accelerator to have direct access to the memory of a wireless device is particularly beneficial as ciphering accelerators typically have very high bandwidth requirements.

In an embodiment, the modem component comprises a hardware modem direct memory access module for providing direct memory access to the memory of the wireless device for the modem module of said wireless device. Direct memory access (DMA) modules typically have need for high frequency access to memory, particularly in wireless devices. Enabling a hardware modem DMA module if present in the wireless device to have direct access to the memory of the wireless device is particularly beneficial. Alternatively or additionally, the application layer component is arranged to provide direct memory access to the memory of the wireless device for the modem module of said wireless device. This again allows direct access to the memory for DMA functionality required by a modem module of the wireless device.

In an embodiment of the method described above, the modem component comprises a modem accelerator.

In an embodiment of the method described above, the modem component comprises a hardware ciphering accelerator, the method comprising: the hardware ciphering accelerator carrying out at least one of encryption of user data for transmission by the wireless device and decryption of user data that has been received by the wireless device.

In an embodiment of the method described above, the modem component comprises a hardware modem direct memory access module, the method comprising: the hardware modem direct memory access module providing direct memory access to the memory for the modem module.

In an embodiment of the method described above, the method comprises the application layer component providing direct memory access to the memory for the modem module.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

Figure 2:
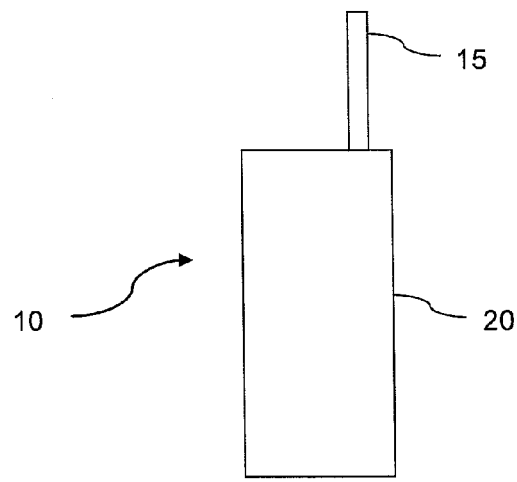
FIG. 2 shows schematically an example of a wireless device according to an embodiment of the present invention.

FIG. 2 shows schematically a wireless device 10 having an antenna 15 and a body 20 which contains the necessary radio/modem module, processor(s) and memory/memories, including an application engine (APE) module, etc. to enable wireless communication with a network.

Figure 3:
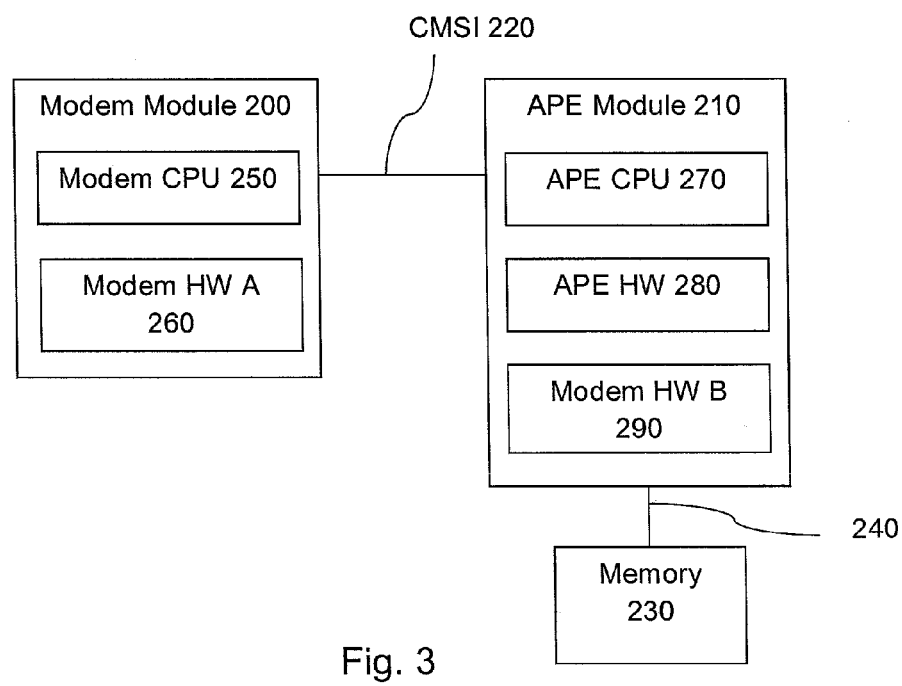
FIG. 3 shows schematically an example of a modem module, an application engine module, and a memory for a wireless device according to an embodiment of the present invention.

FIG. 3 shows schematically a portion of an example of a processing system for use in the wireless device 10 according to an embodiment of the present invention. In FIG. 3, there is shown schematically a modem module 200 connected to an application engine (APE) module 210 via a communication and memory sharing interface (CMSI) 220. The CMSI 220 may be for example a chip-to-chip (C2C) interface, a low latency interface (LLI) or the like. The memory sharing interface and the control/communication interface parts of the CMSI 220 may be provided as a single physical interface or as separate physical interfaces. The APE module 210 is connected to a memory 230 of the wireless device 10 via a memory interface 240. The memory 230 may be for example a random access memory (RAM), such as a synchronous dynamic random access memory (SDRAM). The CMSI 220 enables dynamic random access memory (DRAM) memory sharing to achieve a lower overall component cost through a very low latency interface, in this case by allowing the modem module 200 and the APE module 210 to share the memory 230, with each having direct access to the memory 230 (in the case of the modem module 200, via the CMSI 220).

In one embodiment, the modem module 200 may be a single chip or a chipset comprising for example a CPU (central processing unit) (or plural CPUs) 250 which operates in conjunction with a set of modem hardware A 260 within the modem module 200. The modem module 200 can read data from the memory 230 via the CMSI 220 and the APE module 210, the data then being processed by the modem CPU 250 and the set of modem components A 260, and write data to the memory 230 via the CMSI 220 and the APE module 210. In one embodiment, the modem module 200 and in particular the set of modem components A 260 comprise in general hardware modem processing components that do not need frequent or high bandwidth inputs to and outputs from the memory 230, and thus the bandwidth requirement of the CMSI 220 from the perspective of the modem module 200 is relatively low.

In one embodiment, the APE module 210 may be a single chip or a chipset comprising for example an APE CPU (or plural CPUs) 270 which operates in conjunction with APE hardware components 280 within the APE module 210. The APE module 210 generally, in this example the APE CPU 270 APE hardware components 280 in particular, is constructed and arranged to carry out application layer processing tasks, including for example call handling, user interfaces for calls, messaging, Internet browsing, etc. The APE module 210 further comprises at least one modem hardware component B 290 which can be controlled by the modem CPU 250 via the CMSI 220. In one embodiment, this one or more modem hardware components B 290 in the APE module 210 comprises all components that are required to carry out the processing required by the wireless device 10 that are not provided by the modem CPU 250 and the set of modem hardware components A 260 in the modem module 200. Thus, the modem module 200, including the modem CPU 250 and the first set of modem hardware components A 260, together with the second set of modem hardware components B 290 in the APE module 210 provide all of the modem processing requirements of the wireless device 10. In one particular embodiment, the set of modem hardware components B 290 comprises one or more modem hardware components that require a high frequency and/or bandwidth of the inputs to and outputs from the memory 230.

A particular example of a modem component that requires a high bandwidth connection to the memory 230 is a hardware ciphering accelerator. In many wireless systems, data that is wirelessly transmitted is encrypted in order to preserve confidentiality and privacy for users. A hardware ciphering accelerator carries out encryption of user data for transmission by the wireless device and decryption of user data that has been received by the wireless device. Thus, in one embodiment, the modem hardware component B 290 in the APE module 210 is or includes a hardware ciphering accelerator 290. In use, the hardware ciphering accelerator 290 reads data from the memory 230 and writes data to the memory 230 every time the wireless device 10 receives downlink data or needs to send uplink data. With for example a downlink data rate of 300 Mbit/s and an uplink data rate of 100 Mbit/s, the bandwidth required for communication between the hardware ciphering accelerator 290 and the memory 230 is of the order of 100 MByte/s. Because in this example the hardware ciphering accelerator 290 can access the memory 230 directly via the memory interface 240, and does not have to send or receive these large amounts of data via the CMSI 220, the bandwidth required of the CMSI 200 is reduced or minimised. Also, because of the direct access, access delays to the memory 230 are much shorter for the hardware ciphering accelerator 290. The hardware ciphering accelerator 290 can nevertheless still be controlled by the modem module 200, and by the modem CPU 250 in particular, via the CMSI 220.

A particular example of a modem component that requires high frequency input to and output from a memory is a direct memory access (DMA) hardware component. In general, direct memory access (DMA) allows certain hardware subsystems within a device to access system memory for reading and/or writing independently of a CPU of the device, allowing fast access to the memory and without interrupting operation of the CPU which can continue to be used for other tasks. In the case of a wireless device for example, DMA functionality for the modem module 200 may involve copying data from one location in the memory 230 to another location in the memory 230 for all of the user downlink data and the user uplink data. Thus, in an embodiment, the DMA functionality required for the modem module 200 is carried out within the APE module 210, thus benefiting from direct access to the memory 230 via the memory interface 240. This may be achieved by the modem CPU 250 making use, via the CMSI 220, of DMA hardware resources already provided in the APE module 210, such as in or by the APE hardware 280, to achieve DMA transfers in the memory 230 on behalf of the modem module 200. As an alternative, DMA transfers in the memory 230 for the modem module 200 may be achieved by making use of software running on the APE module 210, such as on the APE CPU 270, again under control of the modem CPU 250 via the CMSI 220. As yet another example, DMA transfers in the memory 230 for the modem module 200 may be achieved by virtue of the modem hardware component(s) B 290 in the APE module 210 being or including a dedicated modem DMA hardware module 290, again under control of the modem CPU 250 via the CMSI 220.

By providing the functionality of at least some modem components in the APE module 210, which is directly connected to the memory 230, the bandwidth requirements of the CMSI 220 can be relatively lower because the set of modem hardware components B 290 in the APE module 210 has direct access to the memory 230. This is particularly beneficial in the case of those modem components that have high bandwidth requirements or high frequency requirements for access to the shared memory 230. In one specific example, providing a modem component such as a hardware ciphering accelerator in the APE module 210 reduces the bandwidth requirements on the CMSI 220 by at least 30%. This reduction in the bandwidth requirements of the CMSI 220 in turn reduces the power consumed by the device 10 as a whole. It also reduces the number of connection pins required at the modem module 200 and the APE module 210 for the CMSI 220, which simplifies manufacture of these components and also may allow the surface area of these components to be reduced. In addition, providing some modem components in the APE module 210, which is directly connected to the memory 230, can improve the performance of those modem components because they are located physically closer and with direct access to the memory 230. It will be understood that in order to keep the bandwidth requirement of the CMSI 220 from the perspective of the modem module 200 as low as possible, in general all modem components that require frequent or high bandwidth inputs to and outputs from the memory 230 are ideally located in the APE module 210 in order to allow them to have direct access to the memory 230. However, for some modem components, this may not be practical or optimal, for example because their operation is tightly coupled to the operation of other components in the modem module 200, such as requiring a high degree of control from the modem CPU 250 or transferring a lot of data to and/or from other components in the modem module 200.

In one embodiment, the modem CPU 250 has access to the configuration port(s) of the modem hardware component(s) B 290 within the APE module 210 via the CMSI 220 in order to be able to control the modem hardware components B 290. Once the modem hardware component(s) B 290 has received an instruction to carry out processing by the modem CPU 250, the modem hardware component(s) B 290 can carry out processing by writing data to and reading data from the memory 230 without any further input from the modem CPU 250. Interrupts can be sent by the modem hardware component(s) B 290 to the modem CPU 250 via the CMSI 220 as required.

It will be understood that the processors or processing systems or circuitry referred to herein may in practice be respectively provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry as appropriate, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, much of the above specific examples concerns providing a hardware ciphering accelerator and/or DMA functionality in the APE module 210, but other components conventionally found in the modem module 200 may effectively be moved to the APE module 210. Specific examples include other hardware accelerators intended to assist the processing of the modem CPU(s) 250 in other tasks, some or all of the internal modem memory, etc. It may also be noted that the modem module 200 may in practice include all of the components necessary to carry out all of the modem processing required by a wireless device 10 so that that modem module may 200 be used in a wireless device 10 with a conventional APE module 210 which does not include any modem components; when the modem module 200 is employed in embodiments of the present invention where the APE module 210 has components that provide part of the modem functionality, redundant modem components in the modem module 200 are not used. For this reason, in some embodiments, it is preferred that the physical size (surface area) of the modem component(s) concerned is small so that this effective duplication of these components in the modem module 200 and the APE module 210 does not unduly increase the overall size of these two modules 200,210.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An application engine module for a wireless device, the application engine module comprising:
    an application layer component for providing at least some application layer processing for the wireless device;
    a modem component for providing at least some modem processing for the wireless device;
    a memory interface for connecting the application layer component and the modem component directly to a memory of the wireless device; and
    a communication and memory sharing interface for connecting the modem component to a modem module of the wireless device and which enables the modem component of the application engine module to be controlled by the connected modem module.

2. The application engine module according to claim 1, wherein the modem component comprises a modem accelerator for performing at least one of reading and decoding data from the memory of the wireless device, passing the decoded data to the application layer component, making a modification to the data, and writing the data back to the memory.

3. The application engine module according to claim 1, wherein the modem component comprises a hardware ciphering accelerator for carrying out encryption of user data for transmission by the wireless device and decryption of user data that has been received by the wireless device.

4. The application engine module according to claim 1, wherein the modem component comprises a hardware modem direct memory access module for providing direct memory access to the memory of the wireless device for the modem module of said wireless device.

5. The application engine module according to claim 1, wherein the application layer component is arranged to provide direct memory access to the memory of the wireless device for the modem module of said wireless device.

6. The application engine module according to claim 1, wherein the wireless device is one of: a mobile phone, a cell phone, a smart phone, a personal digital assistant, a pager, a tablet computer, a laptop computer, a content-consumption and/or generation device for music and/or video, a data card, a USB dongle, a personal computer, and a game console.

7. In combination, a modem module and an application engine module for a wireless device, the modem module being connected to a modem component of the application engine module by a communication and memory sharing interface,
    the application engine module comprising:
    an application layer component for providing at least some application layer processing for the wireless device;
    the modem component, which is for providing, in combination with the modem module, modem processing for the wireless device;
    a memory interface for connecting the application layer component and the modem component directly to a memory of the wireless device,
    wherein the modem module has indirect access to the memory of the wireless device via the communication and memory sharing interface and is capable of controlling the modem component of the application engine module via the communication and memory sharing interface, the modem module being arranged to access the modem component of the application engine module via the communication and memory sharing interface to instruct the modem component to carry out processing for the modem module.

8. The combination according to claim 7, wherein the modem component comprises a modem accelerator for performing at least one of reading and decoding data from the memory of the wireless device, passing the decoded data to the application layer component, making a modification to the data, and writing the data back to the memory.

9. The combination according to claim 7, wherein the modem component comprises a hardware ciphering accelerator for carrying out encryption of user data for transmission by the wireless device and decryption of user data that has been received by the wireless device.

10. The combination according to claim 7, wherein the modem component comprises a hardware modem direct memory access module for providing direct memory access to the memory of the wireless device for the modem module of said wireless device.

11. The combination according to claim 7, wherein the application layer component is arranged to provide direct memory access to the memory of the wireless device for the modem module.

12. The combination according to claim 7, wherein the wireless device is one of: a mobile phone, a cell phone, a smart phone, a personal digital assistant, a pager, a tablet computer, a laptop computer, a content-consumption and/or generation device for music and/or video, a data card, a USB dongle, a personal computer, and a game console.

13. The combination according to claim 7, wherein the modem module and/or the application engine module is provided as a chipset, an application-specific integrated circuit (ASIC) and/or a field-programmable gate array (FPGA).

14. A method of operating a wireless device, the wireless device comprising: a modem module; an application engine module comprising an application layer component for providing application layer processing for the wireless device and comprising a modem component for providing, in combination with the modem module, modem processing for the wireless device; a communication and memory sharing interface for connecting the modem module to the application engine module and which enables the modem component of the application engine module to be controlled by the connected modem module; a memory; and a memory interface for connecting the application engine module directly to the memory; the method comprising:
 at the modem module, accessing the modem component of the application engine module via the communication and memory sharing interface to instruct the modem component to carry out processing for the modem module;
 at the modem component, accessing the memory via the memory interface to use the memory for said processing,
 wherein the modem module has indirect access to the memory of the wireless device via the communication and memory sharing interface and is capable of controlling the modem component of the application engine module via the communication and memory sharing interface, the modem module being arranged to access the modem component of the application engine module via the communication and memory sharing interface to instruct the modem component to carry out processing for the modem module.

15. The method according to claim 14, further comprising, at the modem component, performing at least one of reading and decoding data from a memory of the wireless device, passing the decoded data to the application layer component, making a modification to the data, and writing the data back to the memory.

16. The method according to claim 14, further comprising, at the modem component,
 carrying out at least one of encryption of user data for transmission by the wireless device and decryption of user data that has been received by the wireless device.

17. The method according to claim 14, further comprising, at the modem component,
 providing direct memory access to the memory for the modem module.

18. The method according to claim 14, further comprising, at the application layer component, providing direct memory access to the memory for the modem module.

19. The method according to claim 14, wherein the wireless device is one of: a mobile phone, a cell phone, a smart phone, a personal digital assistant, a pager, a tablet computer, a laptop computer, a content-consumption and/or generation device for music and/or video, a data card, a USB dongle, a personal computer, and a game console.

20. The combination according to claim 14, wherein the modem module and/or the application engine module is provided as a chipset, an application-specific integrated circuit (ASIC) and/or field-programmable gate array (FPGA).

* * * * *

UNITED STATES PATENT AND TRADEMARK OFFICE
CERTIFICATE OF CORRECTION

| | | |
|---|---|---|
| PATENT NO. | : 8,838,847 B2 | Page 1 of 1 |
| APPLICATION NO. | : 13/351389 | |
| DATED | : September 16, 2014 | |
| INVENTOR(S) | : Mika Antero Koikkalainen | |

It is certified that error appears in the above-identified patent and that said Letters Patent is hereby corrected as shown below:

In the Claims

Claim 7 at Column 8, line 54, replace "the wireless device;" with --the wireless device; and--.

Claim 20 at Column 10, line 41, replace "The combination according to claim 14" with --The method according to claim 14--.

Signed and Sealed this
Tenth Day of March, 2015

Michelle K. Lee
*Deputy Director of the United States Patent and Trademark Office*